April 9, 1940.   H. L. BOWERS   2,196,546
DOOR CONSTRUCTION FOR AIRCRAFT
Filed Sept. 14, 1938   3 Sheets-Sheet 1
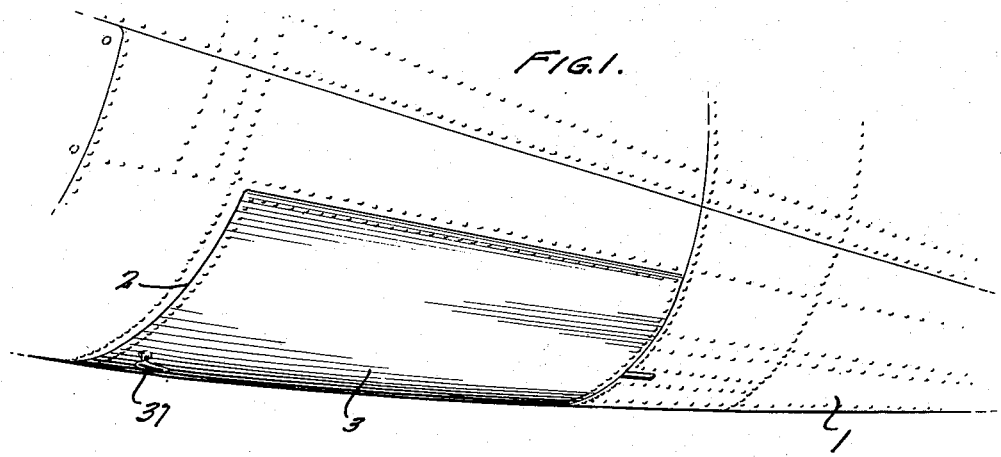
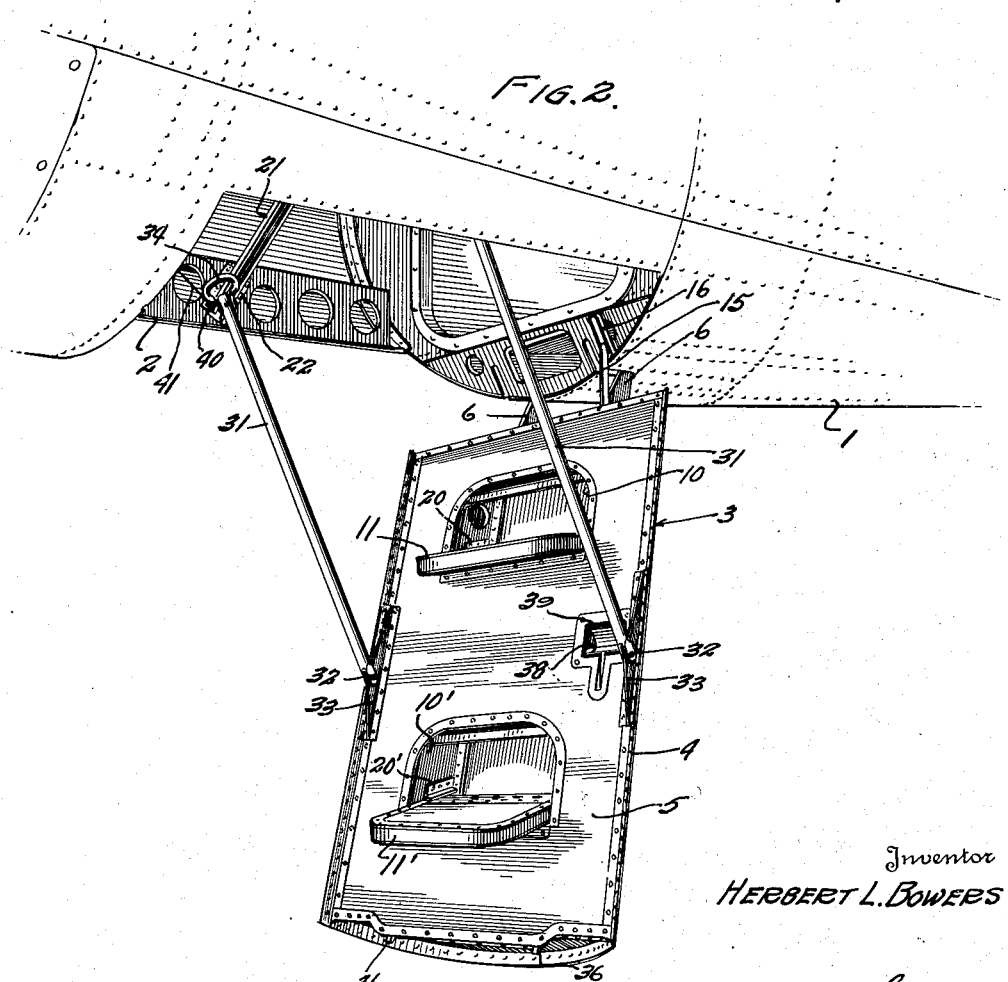
Inventor
HERBERT L. BOWERS
By Semmes, Keegin & Semmes
Attorneys

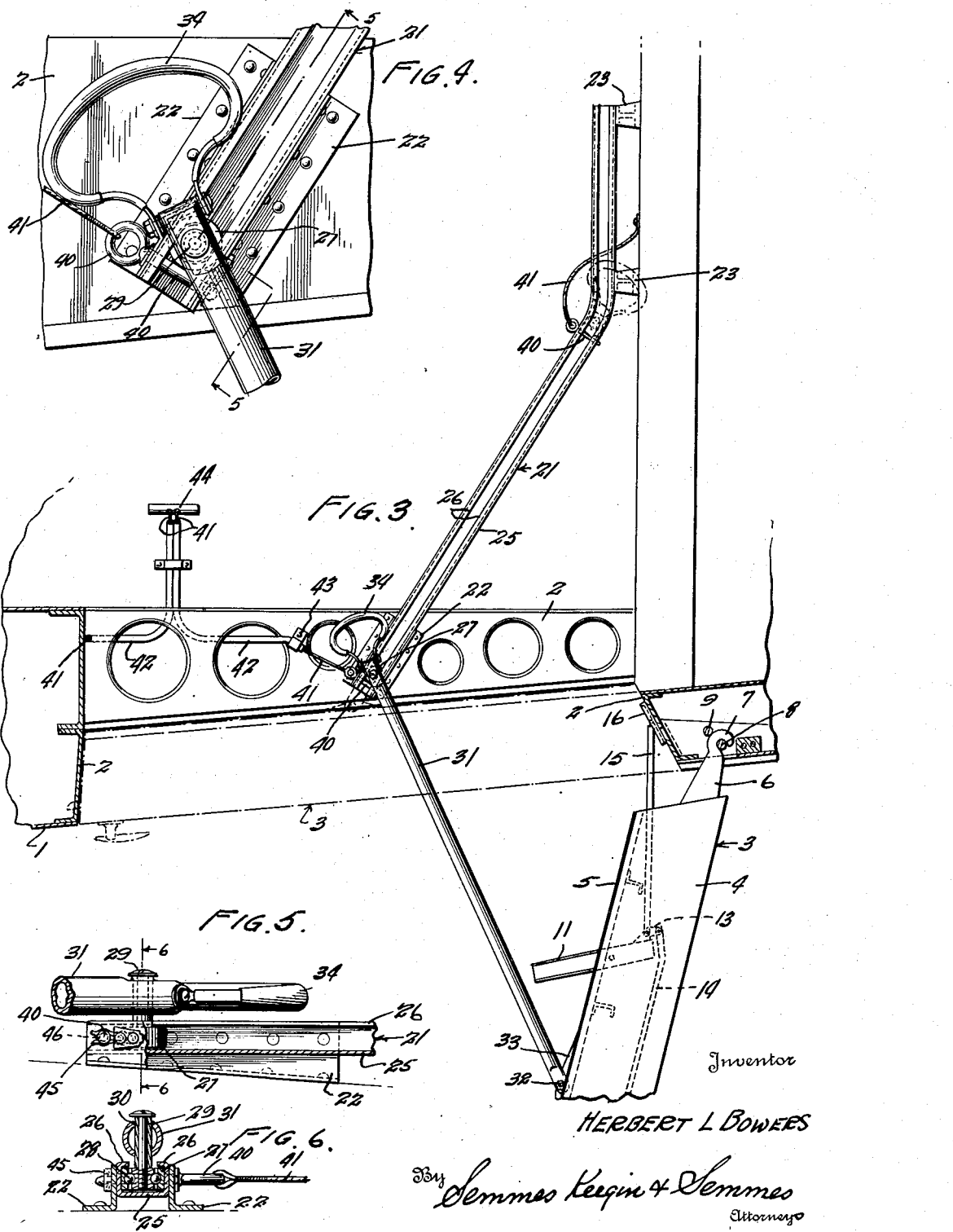

April 9, 1940.  H. L. BOWERS  2,196,546
DOOR CONSTRUCTION FOR AIRCRAFT
Filed Sept. 14, 1938  3 Sheets-Sheet 3
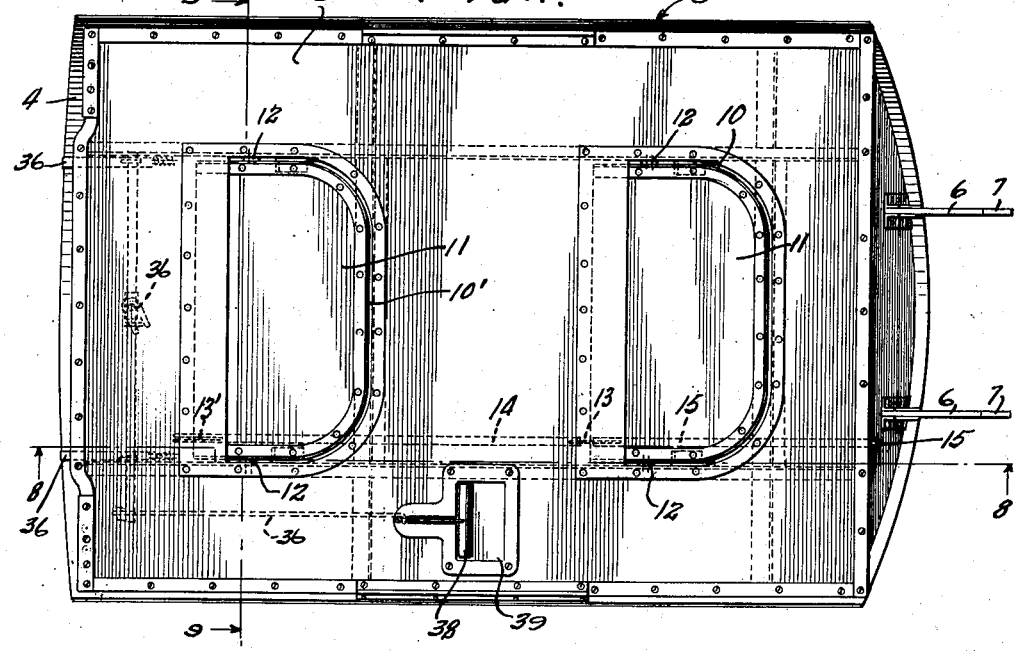
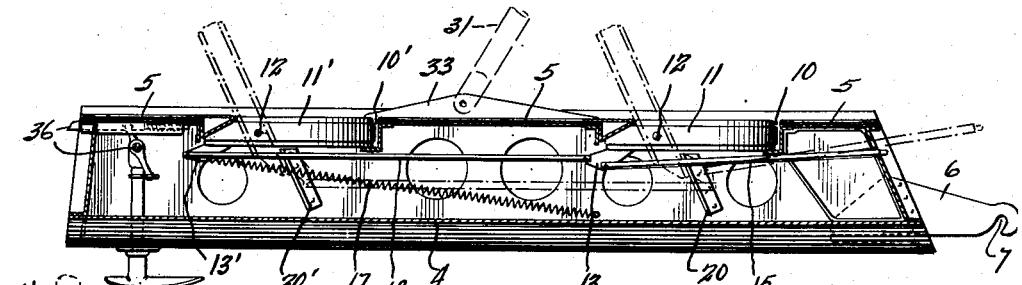
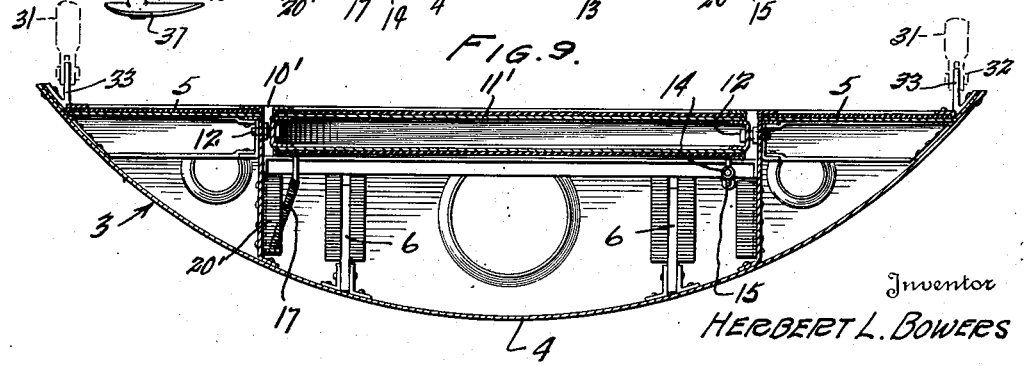
Inventor
HERBERT L. BOWERS
By Semmes, Keegin & Semmes
Attorneys Patented Apr. 9, 1940

2,196,546

UNITED STATES PATENT OFFICE 2,196,546

DOOR CONSTRUCTION FOR AIRCRAFT

Herbert L. Bowers, Kenmore, N. Y., assignor to Bell Aircraft Corporation, Buffalo, N. Y., a corporation of New York Application September 14, 1938, Serial No. 229,953

8 Claims. (Cl. 244—129)

The present invention relates to airplanes and more particularly has reference to means whereby access may be had to the interior of an airplane. While I have shown and described my inventive concept in connection with "heavier than air" aircraft, it is, of course, obvious that it is of broader scope and can be advantageously employed, for instance, in "lighter than air" aircraft.

An object of the present invention is to provide a novel door construction which may be used as an entrance to an airplane.

Another object of the present invention is to provide an access door for an airplane which when in its opened position may be used as a stairway, and which in its closed position forms a portion of the floor of the airplane.

A further object of my invention is to provide means for permitting access to the interior of an airplane which can be released from the airplane while it is in flight, affording an emergency exit.

To accomplish the above and other important objects, this invention embraces the idea of providing a door construction for an airplane the outer surface of which is so constructed that when the door is in its closed position, it will conform to the outer configuration of the fuselage of the airplane. Also, the interior surface of the door in its closed position may be employed as a portion of the floor of the plane.

The door is so assembled that when it assumes its open position, a series of steps will be formed whereby access may be easily gained to the interior of the plane.

In addition, means are further provided to release entirely the door from the airplane for the purpose of providing an emergency exit.

In order to make my invention more easily understood, there is shown in the accompanying drawings means for carrying the same into practical effect without limiting the improvements in their useful applications to the particular constructions which, for the purpose of explanation, have been made the subject of illustration.

In the drawings in which like numerals designate similar parts:

Figure 1 is a fragmentary perspective view of a fuselage of an airplane illustrating the door in closed position.

Figure 2 is a fragmentary perspective view of the fuselage of an airplane showing the door in its opened position.

Figure 3 is a fragmentary view partly in section taken through the doorway depicted in Figure 2.

Figure 4 is an enlarged fragmentary view of the member whereby the door is moved from its opened to its closed position.

Figure 5 is a sectional view taken along line 5—5 of Figure 4.

Figure 6 is a sectional view taken along line 6—6 of Figure 5.

Figure 7 is a top plan view of my novel door construction shown in closed position.

Figure 8 is a sectional view taken along line 8—8 of Figure 7 looking in the direction of the arrows.

Figure 9 is a sectional view taken along line 9—9 of Figure 7.

Referring to the drawings and more particularly to Figures 1 and 2 there is shown an airplane fuselage 1 having a door frame 2 and a door construction 3 suitably pivoted to the farme 2.

It should be noted that the outer surface of the door which I designate 4 conforms to the outer contour of the fuselage of the plane when the door is in its closed position, as shown in Figure 1. It will be readily appreciated that by thus forming the outer surface of the door will not only preserve the lines of the fuselage but will not offer any resistance to the air stream. The inner surface of the door designated 5 is of flat construction and will enable the door to form a portion of the floor of the airplane when the door is closed.

As best illustrated in Figures 3 and 8, the door 3 is provided with a pair of hinges 6. Each hinge is formed with a hooked end 7. The hooked end 7 engages a pin 8 which can be suitably supported in the framework of the airplane. A second pin 9 is positioned adjacent the pin 8 so as to maintain the hook 7 in engagement with the pin 8 when the door 3 is in its normal positions. As will later become more readily apparent, the pin 9 is so positioned that it will permit the hook 7 to be disengaged from the pin 8 when the door is swung beyond its normal lowered or opened position.

As previously pointed out, an important feature of this invention is the provision of a door which when in its opened position may be used as a stairway. Referring to Figures 2 and 8, it can be seen that the inner surface 5 of the door 3 is formed with a pair of recesses 10 and 10'. Steps 11 and 11' are pivotally mounted in the recesses 10 and 10', respectively, at the point 12. While there is shown and described the use of two steps, it is, of course, to be understood that a greater or less number may be used, depending of course upon the size of the door 3. In Figure 9 it can be observed that when the step is housed within its recess, the exposed surface of the step will conform to the inner surface of the door.

Secured to the lower surface of the steps 11 and 11' are plates 13 and 13', respectively. A link 14 is pivotally attached at its extremities to the plates 13 and 13'. Both plates 13 and 13' are attached to the steps at a position forward of the pivot point of the steps to the door. A push rod 15 is pivotally attached at one end to the plate 13. The opposite end of the rod 15, as shown in Figure 3, projects beyond the upper end of the door 3 and is adapted to contact a bumper plate 16 suitably mounted in the frame of the door.

A coil spring 17 has one end attached to the door and its opposite end attached to the plate 13'. Obviously, the spring 17 will tend to move the step 11' about its pivot 12 thereby moving the step to its open position.

When the door 3 is closed, the rod 15 will be forced inwardly by the bumper plate 16. This movement of the rod 15 will rotate the step 11 about its pivot moving it into its recess 10. Simultaneously, the step 11' by virtue of the link 14 will also be moved into its recess 10'. On the other hand, when the door is open, the pressure on the rod 15 by the bumper plate 16 is released and the steps 11 and 11' will be moved about their pivots 12 by the action of the coil spring 17. It should be noted that a pair of stops 20 and 20' are positioned within the door 3 so that they will be struck by the steps in order that they cannot be moved beyond a predetermined distance as clearly depicted by the dot-dash lines of Figure 8.

To move the door from its closed to its open position and vice versa, there is provided the following arrangement. In Figures 2 and 3 it can be seen that a pair of tracks designated generally 21 are mounted on either side of the door frame 2 by brackets 22. The other end of the track 21 is supported by means of a bracket 23 affixed to the frame of the fuselage. Referring to Figures 4 and 6, it can be seen that the track 21 is formed of a substantially U-shaped member 25 having inturned flanges 26. A roller 27 having ball bearings 28 is adapted to ride in the track 21. The roller 27 is carried by a pin 29 which extends through an aperture 30 formed adjacent the end of a rod 31. The opposite end of the rod 31 is pivotally mounted at 32 to a bracket 33 carried by the door 3. A handle grip 34 is removably affixed by a bolt or the like 35 to the rod 31 at a point adjacent the pin 29. The handle grip 34 will, of course, enable the roller 27 to be moved in the track 21.

In Figures 7 and 8, it can be seen that the door is provided with a locking assembly designated 36 which can be of any desirable construction. A handle 37 located outside of the door 3 will permit the door to be operated from the exterior of the plane. However, the locking assembly 36 can be actuated from the interior of the plane by means of a handle or lever 38 which is positioned in a recess 39 formed in the interior of the door as illustrated in Figure 7. Manifestly, this arrangement is particularly efficacious in that the door 3 can be operated either from the interior or exterior of the airplane. An additional means for holding the door 3 in its closed position is the provision of a safety pin 40 carried by a cord 41 attached to the framework of the fuselage. The pin 40 (see Figure 3) is adapted to be positioned in aligned apertures provided in the track 21 beneath the roller 27 when the same is in its upper position as depicted in the dot-dash lines. Obviously, the pin 40 will prevent the roller from moving downwardly in the track.

The lower limit of movement of the roller 27 in the track 21 is controlled by means of a second safety pin 40' which projects through aligned apertures in the track 21. A Bowden wire 41 is attached to the pin 40' and a protective casing 42 surrounds the Bowden wire. The casing is held in the desired position on the door frame by means of brackets 43. The free end of the Bowden wire 41 is attached to an operating handle 44 which can be located at a convenient point within the fuselage of the airplane. A spring clip 45 carried by the track 21 engages an annular groove 46 formed in pin 40' to prevent the accidental withdrawal of the pin due to vibration, etc.

Manifestly, by pulling the handle 44, the pin 40' will be withdrawn from the apertures in the track 21 by means of the Bowden wire 41. This will enable the roller 27 to fall through the end of the track 21.

The operation of the device is as follows. Assuming that the door 3 is closed and it is desired to open the same from the interior of the airplane, the handle 38 is actuated to unfasten the locking assembly 36. The safety pin 40 is then removed from the track 21. The rollers 27 will then move downwardly in the track 21 by gravity carrying with them the rods 31 which are pivotally attached to the door. The limit pins 40' positioned at the lower end of the track will limit the downward movement of the rollers. When the rollers bear against the pins 40', the door 3 will be fully lowered and the rods 31 may be used as hand rails, so to speak. Also, as the door moves downwardly, the pressure of the bumper plate 16 on the rod 15 will be gradually reduced, thereby enabling the spring 17 to move the steps 11 and 11' about their pivots to the open position as shown in Figures 2 and 3. It will be readily appreciated, therefore, that the steps 11 and 11' in conjunction with the rods 31 will permit an individual to enter or leave the interior of the airplane easily.

When it is desired to close the door 3 from its open position from the interior of the airplane, the handles 34 carried by the rods 31 are grasped and the rollers 27 are moved upwardly in the tracks 21. As soon as the rollers reach the limit of their upward movement, the locking assembly 36 is closed by means of the handle 38 and the pin 40 is positioned beneath the roller 27. The door 3 is then locked in proper position. As the door is moving upwardly, the rod 15 will be bearing against the bumper plate 16 thereby moving the steps 11 and 11' to their nested position by virtue of the linkage previously described.

As hereinbefore set forth, an important feature of this invention is the provision of means whereby the door 3 may be completely removed from the door frame to enable the same to be used as an emergency exit while the airplane is in flight. In order to accomplish this purpose, the limit pins 40' at the lower end of the tracks 21 are withdrawn from the apertures in the track by means of the handle 44. Clearly, when these pins are removed, the rollers 27 are free to fall through the open end of the track.

Therefore, when the pins 40' are removed by means of the handle 44 and the locking assembly 36 is opened, the rollers 27 will move down the track 21 and fall through the open end. The door 3 will then swing rearwardly to a point where the hook 7 will be disengaged from the rod 8 and the door will fall from the frame 2. Manifestly, the air stream will aid in moving the door 3 rearwardly. It will be readily apparent that this arrangement is highly desirable since it will enable the door, as before stated, to be employed as an emergency exit during flight.

From the foregoing, it will be easily comprehended that the present invention provides an access door for an airplane which can be cheaply and easily manufactured. Moreover, the door construction consists of relatively few working parts and can be quickly and easily operated either from the interior or exterior of the airplane. In addition, the outer surface of the door will conform to the general contour of the fuselage of the airplane and the interior thereof will form a portion of the flooring of the fuselage. The door is so made that when it is in its open position, a plurality of steps are formed whereby access may be easily had to the interior of the airplane. Furthermore, the door can be completely released from its frame whereby an emergency exit is afforded.

While I have shown and described the preferred embodiment of my invention, it is to be understood that I do not confine myself to the precise details of construction herein set forth by way of illustration as it is apparent that many changes and variations may be made therein by those skilled in the art without departing from the spirit of the invention or exceeding the scope of the appended claims.

I claim:

1. In an airplane construction, a body portion, a door therefor, said door being connected with said body portion by means of a hinge and side supports, recesses within the interior of the door, a plurality of steps pivotally mounted within the recesses, linkage connecting said steps, means by which the linkage may be caused to move the steps into an operative position when the door is opened, and means by which the linkage may be caused to move the steps into said recesses when the door is closed, said side supports being movably mounted in tracks in the interior of the body portion, means to hold the side supports in the upper extremities of the tracks when the door is in closed position, and removable means to support the side supports in the tracks when the door is in open position, and means to release said removable means from the tracks thereby freeing the door from the body portion.

2. In an airplane construction, a body portion, a door therefor, said door being connected with said body portion by means of a hinge and side supports, the exterior side of said door being adapted to conform to said outer surface of the said body portion and the interior side being adapted to conform to the floor of the body, recesses within the interior of the door, a plurality of steps pivotally mounted within the recesses, linkage connecting said steps, means by which the linkage may be caused to move the steps into an operative position when the door is opened, and means by which the linkage may be caused to move the steps into said recesses when the door is closed, said side supports being movably mounted in tracks in the interior of the body, movable means to hold the side supports in the upper extremities of the tracks when the door is in closed position, and removable means to support the side supports in the tracks when the door is in open position, and means to release said removable means from the tracks thereby freeing the door from the body portion.

3. In an airplane construction, a body portion, a door therefor, said door being connected with said body portion by means of a hinge and side supports, recesses within the interior of the door, a plurality of steps pivotally mounted within the recesses, linkage connecting said steps, means by which the linkage may be caused to move the steps into an operative position when the door is opened, and means by which the linkage may be caused to move the steps into said recesses when the door is closed, said side supports being movably mounted in tracks in the interior of the body, means to hold the side supports in the upper extremities of the tracks when the door is in closed position, and removable means to support the side supports in the tracks when the door is in open position, and means to release said removable means from the tracks so as to cause the door to assume an abnormal opened position, said hinge being so constructed that it will be released from its connection with the said body portion when the door assumes an abnormal opened position.

4. In an airplane construction, a body portion, a door therefor, said door being connected with said body portion by means of a hinge and side supports, the exterior side of said door being adapted to conform to said outer surface of the said body portion, and the interior side being adapted to conform to the floor of the body, recesses in the inner surface of the door, a plurality of steps pivotally mounted within the recesses, linkage connecting said steps, means by which the linkage may be caused to move the steps into an operative position when the door is opened, and means by which the linkage may be caused to move the steps into said recesses when the door is closed, said side supports being movably mounted in tracks in the interior of the body portion, movable means to hold the side supports in the upper extremities of the tracks when the door is in closed position, and removable means to support the side supports in the tracks when the door is in open position, and means to release said removable means from the tracks so as to cause the door to assume an abnormal opened position, said hinge being so constructed that it will be released from its connection with the said body portion when the door assumes an abnormal opened position.

5. In an airplane construction, a body portion, a door therefor forming a part of the floor of the airplane body portion, recesses in said door, a step hinged in each recess, means to move the steps into angular relationship with the door when the said door is in open position, and means to pivot the steps on their hinges so as to cause the steps to close the recesses and form a part of the contour of the door, and form a part of the floor of the airplane when the door is in closed position.

6. In an airplane construction, a body portion, a door therefor forming a part of the floor of the airplane body portion, said door being provided with a hinge and side supports, recesses in said door, a step hinged in each recess, tension actuated means to move the said steps into angular relation with the door when the door is in open position, and means to pivot the steps on their hinges against said tension means to cause the steps to close the recesses and form a part 7. In an airplane construction, a body portion, a door therefor forming a part of the floor of the airplane body portion, said door being connected with said body portion by means of a hinge and side supports, the upper extremities of said side supports being slidably mounted within the body portion in such a manner that the side supports will furnish support for the door in either open or closed position, recesses in said door, a step hinged in each recess, means to cause the steps to close the recesses and form a part of the floor of the body of the airplane when the door is in closed position, and means to release said side supports from the body portion so as to cause the door to assume an abnormal open position, said hinge being so constructed that it will be released from its connection with the body portion when the door assumes an abnormal open position.

8. In an airplane construction, a body portion, a door therefor forming a part of the floor of the airplane body portion, said door being connected with said body portion by means of a hinge and side supports, the upper extremities of said side supports being slidably mounted within the body portion in such a manner that the side supports will furnish support for the door in either open or closed position, recesses in said door, a step hinged in each recess, tension actuated means to move said steps into angular relationship with the door when it is open, and means to pivot the steps on their hinges against the said tension means to cause the steps to close the recesses and form a part of the floor of the airplane when the door is in closed position, and means to release said side supports from the body portion so as to cause the door to assume an abnormal position, said hinge being so constructed that it will be released from its connection with the body portion when the door assumes an abnormal open position.

HERBERT L. BOWERS.